United States Patent [19]

Kirby

[11] 4,039,064

[45] Aug. 2, 1977

[54] ADJUSTABLE WORK SUPPORT

[76] Inventor: Roy S. Kirby, Rte. 1, Box 73-A, Deer Park, Wash. 99006

[21] Appl. No.: 700,318

[22] Filed: June 28, 1976

[51] Int. Cl.$^2$ .............................................. B65G 13/12
[52] U.S. Cl. ................................. 193/42; 144/288 R; 248/225.3
[58] Field of Search ............... 193/42; 248/167, 188.7, 248/221 F, 246, 528, 529; 211/107, 111; 249/219 R; 144/288 R, 288 C

[56] References Cited

U.S. PATENT DOCUMENTS

| 417,260 | 12/1889 | Markham | 193/42 |
|---|---|---|---|
| 1,297,745 | 3/1919 | Spencer | 193/42 |
| 1,636,431 | 7/1927 | Parks | 248/167 |
| 1,760,304 | 5/1930 | Feldin | 193/42 |
| 1,764,397 | 6/1930 | Feldin | 193/42 |
| 2,699,188 | 1/1955 | Caldwell | 193/42 |
| 2,750,138 | 6/1956 | Morris | 248/528 |
| 2,818,092 | 12/1957 | Grosset | 193/42 |
| 3,083,806 | 4/1963 | Haines | 193/42 |
| 3,710,734 | 1/1973 | Bofferding et al. | 248/246 |
| 3,797,790 | 3/1974 | Iseki | 248/221 F |

Primary Examiner—Evon C. Blunk
Assistant Examiner—Jeffrey V. Nase
Attorney, Agent, or Firm—Wells, St. John & Roberts

[57] ABSTRACT

An adjustable work support that is received on an upright post of standard cross-sectional lumber dimensions. The support includes an elongated work supporting arm member. The arm is formed of an elongated channel having longitudinally spaced upright folded tabs. The tabs rotatably mount a workpiece holding roller. Furcations extend beyond one end of the channel. A spaced pair of cross members interconnect the furcations at elevationally offset locations. The cross members are horizontally spaced by a distance substantially equal to a standard cross-sectional measurement of an upright post. The cross members are arranged in relation to the channel and roller so they will bind against the upright post when the roller is held in a substantially horizontal position, and so they will disengage from the post when the roller is inclined from the horizontal position. Thus, the arm can be selectively positioned at any desired elevational location on the upright post.

8 Claims, 8 Drawing Figures

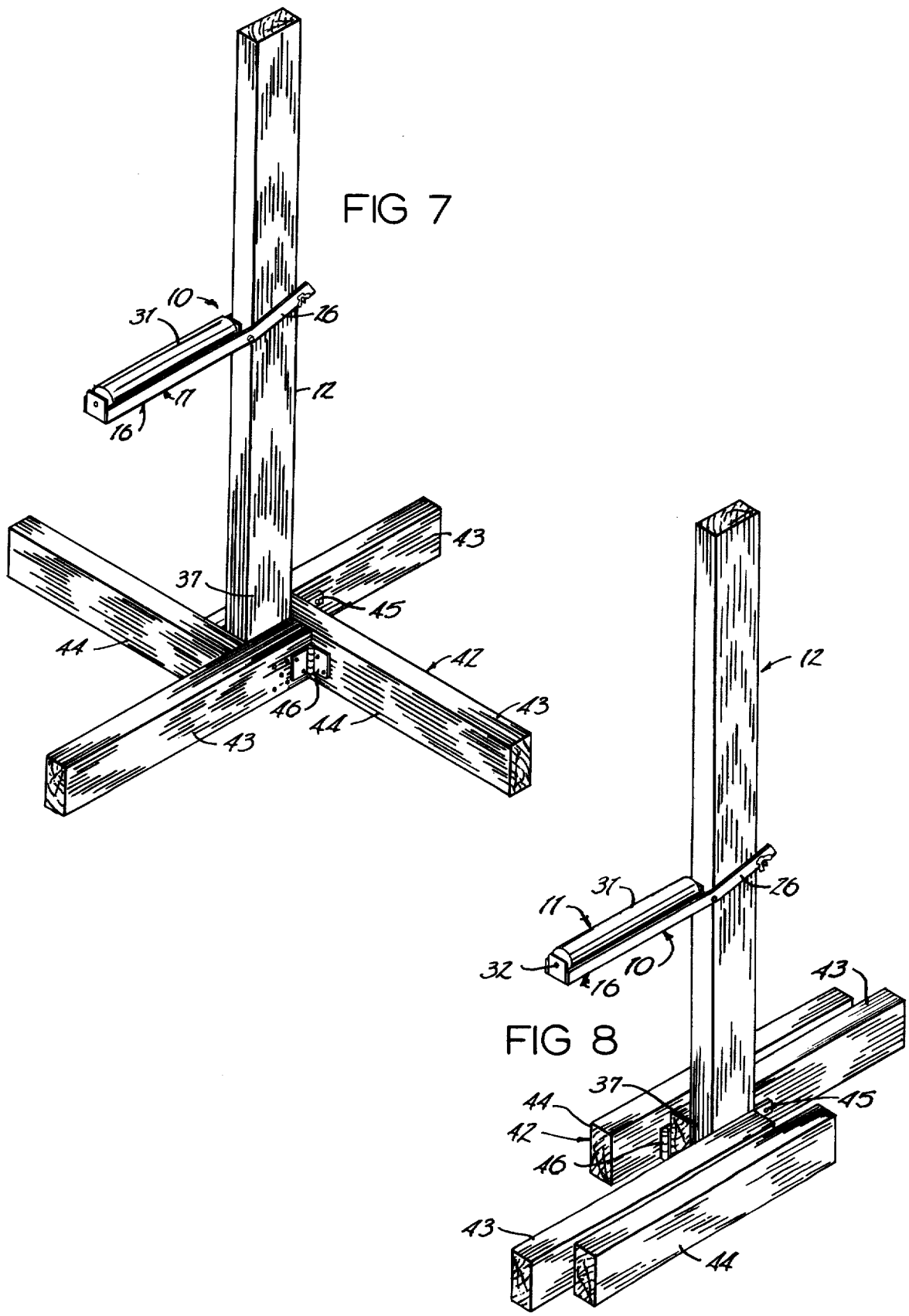

ADJUSTABLE WORK SUPPORT

BACKGROUND OF THE INVENTION

It is often desirable in the woodworking industry when utilizing table saws or "radial arm" saws to provide additional support beyond the table surface of such saws for the loose ends of excessively long workpieces. It is further desirable to obtain such a support that is elevationally adjustable so a workpiece may be located at a desired elevation.

Various apparatus have been designed and contructed to facilitate additional support of workpieces, particularly long lengths of lumber, with such supports utilized in conjunction with various woodworking equipment. Such supports, however, are often complex in nature and priced beyond the means of the average home "do-it-yourselfer". It has therefore become desirable to provide some form of support that is very simple in construction and easily adapted to be used to perform many different support functions, especially in the woodworking field.

The present invention employs a minimal number of elements to provide an extremely useful and low cost accessory both for the home workshop and for industrial applications. The present support includes a support arm assembly that is formed basically of four separate elements. An elongated channel includes integral upwardly turned tabs that provide rotatable support for an elongated roller member. Integral furcations extend beyond an end of the channel and receive two longitudinally spaced cross members. These members are so arranged in relation to the roller that they may be placed over an upright post of standard lumber dimensions. The members may grip the post and hold the support arm at a desired elevation, or release the post to enable elevational positioning of the arm along the entire post length. In gripping, the cross members are wedged against the upright post when the roller is brought to a substantially horizontal condition. Release occurs when the roller and associated portions of the channel are inclined pivoting the cross members away from binding engagement with the post sides.

SUMMARY OF THE INVENTION

An adjustable work support is described herein that includes a movable work support arm receiving on an upright post of standard lumber cross-sectional dimensions. The arm includes an elongated upwardly open channel. The channel includes a horizontal base and integral upright side wall extending longitudinally from an inner end to an outer end of the base. Upright transverse end tabs formed of integral upwardly bent portions of the base are located at the inner and outer channel ends. A roller is freely rotatably carried between the upright tabs. Parallel furcations that are integral with the side walls protrude beyond the inner end of the channel. First and second cross members extend transversely between the furcations. The first cross member is located adjacent to the inner channel end and the second cross member is longitudinally spaced from the first cross member by a horizontal distance that is substantially equal to the standard lumber cross-sectional dimension of the post. The second cross member is also elevationally offset from the first cross member to bind against the upright post when the arm is located in a horizontal position and to release the post when the arm is inclined from the horizontal position.

An upright post is included that is of standard lumber rectangular cross section. First oppositely projecting horizontal braces are fixed to opposite sides of the post at a bottom end thereof. A second set of oppositely projecting horizontal braces abut remaining opposite sides of the post at the bottom post end. These braces project outwardly at right angles from the first braces. Hinge members interconnect adjacent braces so that the second braces may be folded into juxtaposition with the first braces.

It is a primary object of the present invention to provide an adjustable support assembly that is extremely simple in construction and is therefore easy to manufacture and may be considerably less expensive to purchase than prior related supports.

An additional object is to provide such a support wherein the support arm is adapted to be received on an upright post of standard lumber cross-sectional dimensions.

An additional object is to provide such a support arm that is easily elevationally adjusted along the height of an upright post.

These and still further objects and advantages will become apparent upon reading the following detailed description which, taken with the accompanying drawings, discloses a preferred form of my invention. It is not intended however, that the following description and drawings be taken as restrictions upon the scope of my invention. Only the claims found at the end of this application are intended to place such restrictions and are given as definitions of what I consider to be my invention.

BRIEF DESCRIPTION OF THE DRAWINGS

FIG. 7 is a pictorial view of the present invention with the post structure shown in FIG. 2; and FIG. 8 is a view similar to FIG. 7 only showing the post brace members in a folded, storage condition.

DETAILED DESCRIPTION OF A PREFERRED EMBODIMENT

Figure 1:
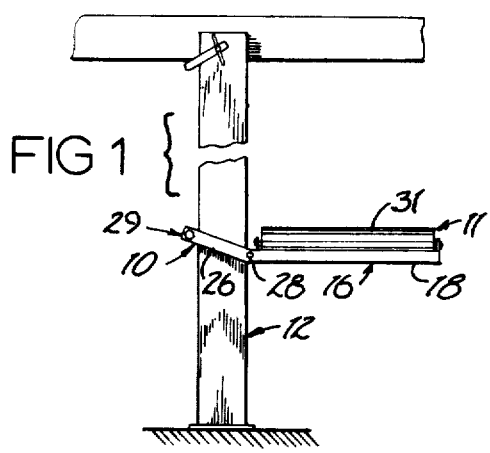
FIG. 1 is a fragmentary view of the support arm of my invention shown mounted on an upright post of standard cross-sectional dimension lumber.
Figure 2:
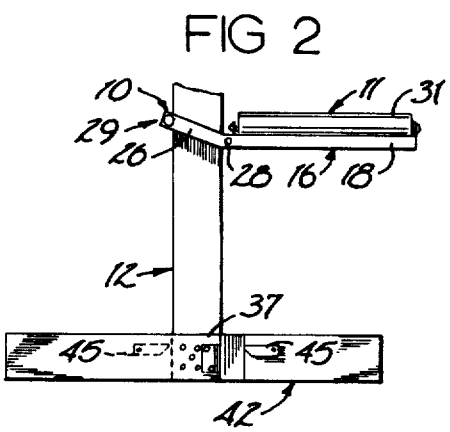
FIG. 2 is a similar elevational view showing the present support arm on a specially designed upright post and brace structure.
Figure 3:
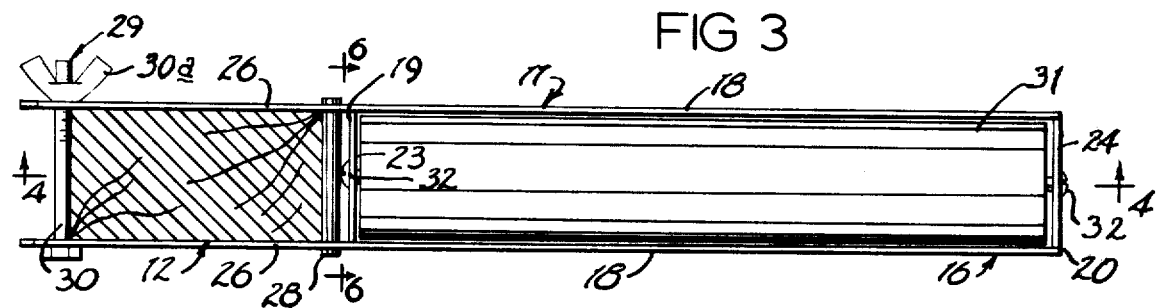
FIG. 3 is an enlarged plan view.

A preferred form of my adjustable work support is illustrated in the accompanying drawings and is generally designed therein by the reference character 10. The support includes a work support arm 11 that is adjustably received along an upright post 12. FIGS. 1 and 2 show alternate arrangements by which the support arm 11 may be mounted to posts 12 of different configuration. FIG. 1 shows the post 12 as being a standard random length board while FIG. 2 shows a specific braced form of the post that is preferably utilized with the present support arm 11.

Details of the work support arm 11 are shown specifically in FIGS. 3 through 6. As shown therein, the support includes an elongated channel 16. The channel 16 is made up of a horizontal elongated base 17 and longitudinal integral upright sides 18. The sides extend longitudinally between an inside channel end 19 and an outside end 20. Ends 19 and 20 are defined by an inside end tab 23 and an outer end tab 24. These tabs are also integral with the channel 16 and are formed by bending portions of the base 17 upwardly between the transversely spaced sides 18. The sides 18 extend on inwardly past the inner end 19 to form two projecting furcations 26. The furcations 26 are integral with the sides 18.

It may be noted at this point that all elements presently described are formed by simply cutting and bending operations on a single piece of channel stock. It is preferable that these elements be formed from standard extruded aluminum channel of generally U-shaped cross section. Such material is lightweight by nature and inexpensive and relatively easy to form into the specific shape as shown in the drawings.

The projecting furcations 26 receive a first cross member 28 and a second cross member 29. The first cross member 28 extends transversely between the furcations 26 adjacent the inside tab 23. It is formed of a metal rod that is slidably fitted through appropriate apertures in furcations 26. The ends of the rod are peened to allow slight sliding movement of the rod within the furcations, but also to prevent removal of the pin therefrom. The cross member 28 extends substantially transverse to the length of the channel and interconnects the furcations. The second cross member 29 is comprised of a nut and bolt combination. The shank of the threaded bolt 30 is received within appropriate apertures formed through the furcations 26 at a location longitudinally spaced from the first cross member 28. The bolt shank is parallel to the first cross member but is elevationally offset therefrom with respect to the horizontal plane of the channel base 17. A wing nut 30a is threadably received on the shank to enable clamping action of the furcations against sides of the post.

Figure 4:
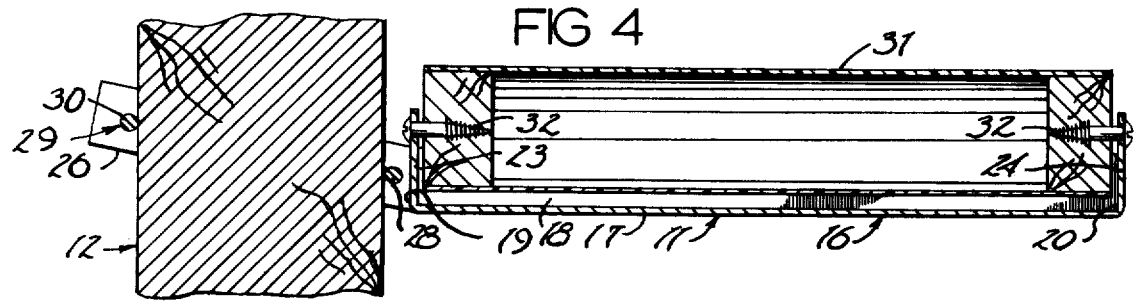
FIG. 4 is an elevational section view taken along line 4—4 in FIG. 3.
Figure 5:
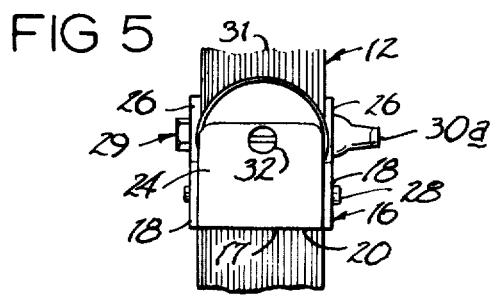
FIG. 5 is an end view as seen from the right in FIG. 4.
Figure 6:
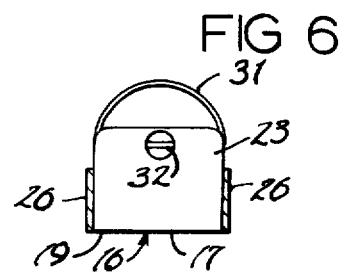
FIG. 6 is a sectioned end view taken along line 6—6 in FIG. 3.

The furcations 26 are angularly oriented with respect to the horizontal base 17 to facilitate location of the cross members 28 and 29 at their elevational offset positions. As shown in FIG. 4, the horizontal distance between the cross members is substantially equal to the width dimension of the post 12. This distance corresponds to a standard actual width dimension of a standard lumber width. In other words, the horizontal distance between member 28 and 29 would be 3.5 inches in order to operate upon a post formed of a standard lumber 2 × 4. However, the actual distance along a straight line between the cross members is substantially greater than the board width. Therefore, when the cross members are oriented substantially horizontally, the sides of the post become disengaged and the support arm is free to be elevationally moved along the length of the post. However, when the base is located in a horizontal plane, the corresponding horizontal distance between the cross members is reduced to the specific width dimension and the post sides become wedged between the cross members. The support arm will support itself on the post at that particular location along the post. Additional weight applied to the channel will only serve to more firmly bind the cross members against the post sides and thereby more securely attach the support arm to the post at that elevation.

An elongated roller 31 is supplied that is rotatably mounted between the upright tabs 23 and 24. It is connected by common wood screws 32 that extend through appropriate apertures in the end tabs and threadably engage opposite ends of the roller along the longitudinal center axis thereof. A loose relationship exists between the screws and tabs to allow relatively free rotation of the roller about an axis that is parallel with the horizontal plane of base 17. The roller is particularly useful in conjunction with woodworking operations to support the free loose ends of boards that are being operated on by woodworking machinery such as table saws, planers, or the like. The roller will allow free longitudinal movement of the workpiece (board) while providing elevational support therefor. Further, the peripheral roller surface is smooth to allow axial sliding of a workpiece on the roller. Thus the roller will not guide a long board away from a cutting line when the board length and roller are not in a perpendicular relationship.

A desired form of upright post assembly is shown in FIGS. 2, 7, and 8 of the drawings. In this configuration, a standard upright post 12 is utilized that includes a specially designed stand arrangement at a bottom end 37 thereof. The stand is generally indicated at 42 and includes a first set of braces 43 and a second set 44. The first set of braces 43 are affixed to opposite sides of the post and extend in opposite directions in a horizontal plane. Pivoted lugs 45 selectively lock the braces in the open operative position.

The second set of braces 44 are attached by hinges 46 to the first of braces 43. Braces 44 also extend in opposite directions and engage the remaining opposite sides of the upright post. The two sets of braces are normally perpendicular to one another when the stand is in an operative condition as shown in FIGS. 2 and 7. However, the second set of braces may be folded into juxtaposition with the first brace set 43 to facilitate storage of the support assembly (FIG. 8).

In operation, the work support arm 11 is first mounted to an upright post 12. The post 12 may be as shown in FIG. 1 as being comprised of a standard cross-sectional size piece of lumber that includes a width dimension corresponding to the horizontal distance (in the plane of base 17) between the cross members 28 and 29. If such a board is used, some additional external support must be provided to secure the board in an upright condition. This may be accomplished as shown in FIG. 1 by resting the lower end of the board against a floor surface and clamping the upper end to a floor or ceiling joist. Once this step has been accomplished, the support arm is ready to be elevationally positioned at a desired location along the length of the post.

Preferably the support arm 11 is used in conjunction with the stand 42. Prior to such use, the stand braces must be folded to operative position. That is, the braces 44 must be folded outwardly from the positions shown in FIG. 8 to the positions shown in FIG. 7.

Elevational positioning of the support arm 11 is accomplished by holding the channel and roller in an inclined orientation such that the cross members 28 and 29 lie within a substantially horizontal plane. In this position, the horizontal distance between the cross member is greater than the corresponding width dimension of the post. Therefore, the support arm assembly may be freely elevationally moved along the length of the post to any desired elevation.

To secure the support arm in a selected elevational location, the roller and channel are swung downwardly to a horizontally orientation. This movement brings the cross members out of the horizontal plane to wedge against the adjacent sides of the post. The cantilevered weight of the channel and roller serves to wedge the cross members against the upright post. Additional weight of a workpiece held on the roller only causes greater clamping force between the cross members 28 and 29 to grip the post. Should a post have certain irregularities wherein the cross-sectional width dimension of the post becomes less than the horizontal distance between cross members 28 and 29, a small wedge may be pressed between one of the cross members and the post to secure the arm in a horizontal position.

The bolt and nut assembly may be utilized to more permanently secure the support arm to the post. It also enables removal from posts such as that shown in FIG. 1. Tightening the wing nut on the bolt shank brings the furcations 26 together (sliding slightly along member 28) against the sides of the post. When it is desirable to again elevationally move the support arm along the post, the bolt and nut assembly are loosened to relax the gripping pressure of the furcations 26 against the post sides.

It may have become apparent from the above description and attached drawings that various changes and modifications may be made therein. It is therefore intended that only the following claims be taken as definitions of what I consider as my invention.

What I claim is:

1. An adjustable work support, comprising:
   an upright post formed of standard lumber of rectangular cross section;
   first oppositely projecting horizontal braces fixed to opposite sides of the post at a bottom end thereof;
   second oppositely projecting horizontal braces abutting remaining opposite sides of the post at the bottom end thereof and projecting at right angles from the first braces;
   two hinge members each interconnecting a second brace with an adjacent first brace such that the second braces may be folded into juxtaposition with the first braces;
   an elongated work support arm slidably received on the upright post for protruding laterally from the post to provide a support surface for a workpiece;
   lugs pivotably mounted to the first horizontal braces selectively operable to lock the second set of braces in an operative position wherein the first and second sets of braces are substantially perpendicular to one another; and
   wherein the work support arm includes elevationally offset post engaging means for binding against the post when the arm is in a horizontal position and for releasing the post when the arm is inclined from the horizontal position.

2. The work support as set out by claim 1 further comprising a roller rotatably mounted on the work support arm for receiving and movably supporting a workpiece.

3. An adjustable work support, comprising:
   an upright post formed of standard lumber of rectangular cross section;
   first oppositely projecting horizontal braces fixed to opposite sides of the post at a bottom end thereof;
   second oppositely projecting horizontal braces abutting remaining opposite sides of the post at the bottom end thereof and projecting at right angles from the first braces;
   two hinge members each interconnecting a second brace with an adjacent first brace such that the second braces may be folded into juxtaposition with the first braces;
   an elongated work support arm slidably received on the upright post for protruding laterally from the post to provide a support surface for a workpiece; and
   wherein the work support arm includes elevationally offset post engaging means for binding against the post when the arm is in a horizontal position and for releasing the post when the arm is inclined from the horizontal position;
   said work support arm comprising:
   an elongated upwardly open channel having a horizontal base and upright side walls integral with the base and extending longitudinally from an inner end to an outer end thereof;
   upright transverse end tabs formed of integral upwardly bent portions of the base at the inner and outer channel ends;
   parallel furcations integral with the side walls and protruding beyond the inner end of the channel; and
   an elongated roller rotatably mounted between the end tabs.

4. The work support as set out by claim 3 wherein the post engaging means is comprised of:
   a first cross member extending transversely between the furcations adjacent the inner end of said channel;
   a second cross member extending longitudinally spaced from the first cross member by a horizontal distance substantially equal to a standard lumber cross-sectional dimension and extending transversely between the furcations;
   wherein the second cross member is elevationally offset from the first cross member.

5. The work support as set out by claim 4 wherein the second cross member is comprised of a headed bolt and nut combination and wherein the furcations are apertured to receive the shank of the bolt so the nut may be tightened to force the furcations together and clamp the post therebetween.

6. A work support arm adapted to be releasably fitted to an upright post of standard lumber cross-sectional dimensions, comprising:
   an elongated upwardly open channel having a horizontal base and upright side walls integral with the base and extending longitudinally from an inner end to an outer end thereof;
   upright transverse end tabs formed of integral upwardly bent portions of the base at the inner and outer channel ends;
   parallel furcations integral with the side walls and protruding beyond the inner end of the channel;
   a first cross member extending transversely between the furcations adjacent the inner end of said channel;
   a second cross member longitudinally spaced from the first cross member by a horizontal distance substantially equal to a standard lumber cross-sectional dimension and extending transversely between the furcations;
   wherein the second cross member is elevationally offset from the first cross member; and
   a roller rotatably mounted between the end tabs for receiving and movably supporting a workpiece.

7. The work support as set out by claim 6 wherein the second cross member is comprised of a headed bolt and nut combination and wherein the furcations are apertured to receive the shank of the bolt such that the nut may be tightened to force the furcations together and clamp the post therebetween.

8. The work support as set out by claim 6 wherein the roller has a smooth peripheral surface to allow axial sliding of a workpiece thereon.

* * * * *